United States Patent [19]

Yoshida et al.

[11] Patent Number: 5,336,556
[45] Date of Patent: Aug. 9, 1994

[54] HEAT RESISTANT NONWOVEN FABRIC AND PROCESS FOR PRODUCING SAME

[75] Inventors: Makoto Yoshida, Ibaraki; Nobuo Takahashi; Koichi Hosoyama, both of Ikoma, all of Japan

[73] Assignee: Teijin Limited, Osaka, Japan

[21] Appl. No.: 852,270

[22] PCT Filed: Aug. 21, 1991

[86] PCT No.: PCT/JP91/01111
§ 371 Date: Jun. 2, 1992
§ 102(e) Date: Jun. 2, 1992

[87] PCT Pub. No.: WO92/06238
PCT Pub. Date: Apr. 16, 1992

[30] Foreign Application Priority Data

Oct. 3, 1990 [JP] Japan ................................ 2-263730
May 22, 1991 [JP] Japan ................................ 3-145212

[51] Int. Cl.$^5$ .............................................. D04H 1/58
[52] U.S. Cl. ..................................... 428/288; 156/296; 156/308.2; 428/212; 428/296; 428/297; 428/902
[58] Field of Search ............... 428/288, 902, 296, 212, 428/297; 156/290, 296, 308.2

[56] References Cited

U.S. PATENT DOCUMENTS 4,424,250  1/1984  Adams et al. .................... 428/198

FOREIGN PATENT DOCUMENTS

| | | |
|---|---|---|
| 6068990 | 2/1991 | Australia . |
| 7704391 | 12/1991 | Australia . |
| 056418 | 7/1982 | European Pat. Off. . |
| 285338 | 10/1988 | European Pat. Off. . |
| 2600209 | 7/1976 | Fed. Rep. of Germany . |
| 52-53069 | 4/1977 | Japan ..................... D04H 1/54 |
| 61-289162 | 12/1986 | Japan ..................... D04H 1/54 |
| 2-26975 | 1/1990 | Japan ..................... D04H 1/54 |

OTHER PUBLICATIONS

Derwent Publications Ltd., London, GB; AN 87-032977 CO5 & JP-A-61 289 162 (Nippon Vilene) 19 Dec. 1986.

Derwent Publications Ltd., London, GB: AN 91-213267 C29 & JP-A-3 137 260 (Teijin KK) Jun. 1991.

Derwent Publications Ltd., London, GB; AN 91-213266 C29 & JP-A-A-3 137 259 (Teijin KK) Jun. 1991.

Derwent Publications Ltd., London, GB; AN 90-072557 C10 & JP-A-2 026 975 (Teijin KK) Jan. 1990.

*Primary Examiner*—James J. Bell
*Attorney, Agent, or Firm*—Burgess, Ryan & Wayne

[57] ABSTRACT

A heat resistant nonwoven fabric comprises 95 to 50% by weight of heat resistant fibers and 5 to 50% by weight of thermoplastic resin, the thermoplastic resin being in the form of pillar-shaped melt-bonding members located between the heat resistant fibers, to thereby bond the heat resistant fibers to each other therethrough, has an excellent heat resistance, formability and concealing effect, and a relatively low density, and is useful as an air filter and a covering sheet for heat resistant shaped articles.

8 Claims, 2 Drawing Sheets

HEAT RESISTANT NONWOVEN FABRIC AND PROCESS FOR PRODUCING SAME

BACKGROUND OF THE INVENTION

TECHNICAL FIELD

The present invention relates to a heat resistant nonwoven fabric and a process for producing same. More particularly, the present invention relates to a heat resistant nonwoven fabric useful as a heat resistant air filter, a covering material for a heat resistant shaped article, or a surface-covering material for an uneven surface of a machine part or of a heat resistant heat-insulating material and a process for producing same.

BACKGROUND ART

Hitherto as a heat resistant nonwoven fabric, a wet type nonwoven fabric comprising wholly aromatic polyamide fibers and wholly aromatic polyamide pulp fibers is generally known. Also, a heat resistant nonwoven fabric produced by using, as melt-bonding fiber component, undrawn wholly aromatic polyamide fibers and by heat press-bonding other fiber component through the melt-bonding fiber component, is known from Japanese Examined Patent Publication No. 59-1818.

Further, Japanese Examined Patent Publication No. 58-31112 discloses polyphenylenesulfide fibers (hereinafter referred to as PPS fibers) as thermoplastic fibers.

Japanese Unexamined Patent Publication Nos. 57-16,954 and 61-289,162 disclose heat resistant felts and spun-bond nonwoven fabrics made from PPS fibers, and dry type heat resistant nonwoven fabrics made by employing, as a melt-bonding fiber component, the PPS fibers and heat press-bonding other fiber components through the PPS fibers.

Those conventional heat resistant nonwoven fabrics contain the heat-resistant fibers brought into close contact with each other, and thus have a relatively high density. Therefore, the conventional heat resistant nonwoven fabrics are not suitable as a heat resistant air filter or a heat resistant and formable covering material.

As a process for producing a nonwoven fabric having a density gradient, there are known a process in which a plurality of nonwoven fabrics differing in density from each other are laminated, a process in which a nonwoven fabric containing thermoplastic fibers is passed through a pair of upper and lower rolls differing in temperature from each other, or a process in which a nonwoven fabric is subjected to a needling.

Nevertheless, the conventional wet or dry type nonwoven fabrics have a high density, and therefore, are disadvantageous in that, when used for an air filter, a large amount of dust is accumulated on a surface of the filter and a pressure loss is greatly increased. Also, the conventional heat resistant felts have a high density, and thus exhibit an undesirable large pressure loss, as mentioned above. Further, the conventional spun bond nonwoven fabrics and nonwoven fabrics made by the needling process exhibit the same disadvantages as mentioned above.

In the conventional process in which a plurality of nonwoven fabrics differing in density from each other are laminated, two steps must be combined, and thus the process becomes complicated. Also, when used as an air filter, a concentrical clogging occurs locally in the joint portion of the two nonwoven fabric layers, and therefore, a pressure loss is greatly increased. Also, since the conventional laminated nonwoven fabric does not have a discontinuous density gradient in the direction of the thickness thereof, when used as a filter, each nonwoven fabric layer exhibits an undesirable fractional and concentrical filtering performance.

In the process in which a nonwoven fabric is pressed between a pair of rolls to produce a nonwoven fabric having a density gradient, only a surface portion brought into contact with a high temperature roll has an extremely high density, and thus, in the nonwoven fabric produced by the above-mentioned process, a concentrical clogging occurs locally in the high density portion.

In the process for producing a nonwoven fabric by needling, it is difficult to impart a continuous density gradient in the direction of the thickness thereof, by needling. Usually, to obtain appropriate degrees of a stuffing and interlacing of fibers, it is necessary to increase a density of the needling. Also, it is difficult to impart a density gradient to a nonwoven fabric.

It is known that a heat resistant shape-covering nonwoven fabric is produced by a process in which a web comprising wholly aromatic polyamide staple fibers is resin-processed with a heat resistant resin, for example, phenol resin or polyimide resin, mixed with pigment or carbon particles, or another process in which heat resistant staple fibers and undrawn fibers are interlaced with each other by applying water streams thereto, to form a mixed web and then the mixed fibers in the web are melt-bonded to each other by a heat-pressing operation, as disclosed in Japanese Unexamined Patent Publication No. 63-28,962.

Where the conventional heat resistant nonwoven fabrics are employed as heat resistant shape-covering fabrics, a heat resistant nonwoven fabric is resin-processed by a resin mixed with an organic or inorganic pigment, to enhance a concealing effect for a heat resistant heat-insulating material to be covered. As a result of the resin-processing, however, almost all of the intersecting points of the fibers are fixed, and thus the resultant resin-processed shaped heat resistant covering nonwoven fabric exhibits an undesirablly lowered stretchability. When the stretchability is lowered, wrinkles are generated in a shape-covering procedure. Also, when stretched, low density portions are formed in the nonwoven fabric, and these portions cause an unevenness in the concealing effect of the nonwoven fabric. Also, the resin-processing causes an increase in the production cost. Further, the resin-processed nonwoven fabric is disadvantageous in that it has a hard touch, low softness, high surface smoothness, high reflection of light, and low color-deepening effect.

In the nonwoven fabric produced by interlacing fibers with each other by the action of water streams (jets), an unevenness in the degree of interlacing of the fibers with each other is generated by the effect of an impact of the water jets and by the action of a net receiving the water jets, and in particular, weakly interlaced portions of the fabric become thinner than the other portions and exhibit a low concealing effect. Also, strongly interlaced portions of the fabric have a lowered stretchability, and thus the fabric exhibits, as a whole, a reduced elongation and the shapability of the fabric is lowered. Further, the nonwoven fabric obtained by interlacing the fibers with each other by the water jet action and then heat press-bonding the fibers to each other, exhibits an even lower elongation and shapability.

The nonwoven fabric produced by a wet process has a high density and a low stretchability, and thus exhibits a poor shapability and wrinkles are easily generated on the fabric.

The needle-punched nonwoven fabrics and spun bond nonwoven fabrics have disadvantages similar to the wet type nonwoven fabrics, and exhibit a hard and rough touch and a low softness.

DISCLOSURE OF THE INVENTION

An object of the present invention is to provide a heat resistant nonwoven fabric having a relatively low density and a density gradient continuous in the direction of thickness thereof, and a process for producing same.

Another object of the present invention is to provide a heat-resistant nonwoven fabric useful as a heat-resistant filter having a small pressure loss and high filtration efficiency, and a process for producing same.

Further object of the present invention is to provide a heat resistant nonwoven fabric useful for easily producing a covering product having a satisfactory formability and concealing effect, a soft surface touch, an excellent color-deepening effect, a high flame retardancy and a uniform quality, and a process for producing same.

The heat resistant nonwoven fabric is characterized by comprising 95 to 50% by weight of heat resistant fibers and 5 to 50% by weight of thermoplastic resin melt-bonding members melt-adhered to at least portions of the heat resistant fibers, to bond the fibers to each other, the thermoplastic resin melt-bonding members, through which the heat resistant fibers are bonded to each other, extending in the form of pillars.

The process of the present invention for producing a heat resistant nonwoven fabric is characterized in that 95 to 50% by weight of heat resistant fibers are mixed with 5 to 50% by weight of thermoplastic fibers and a heat treatment with hot air at a temperature higher than the melting point of the thermoplastic fibers is applied to the mixture without pressing same.

BEST MODE OF CARRYING OUT THE INVENTION

Figure 1:
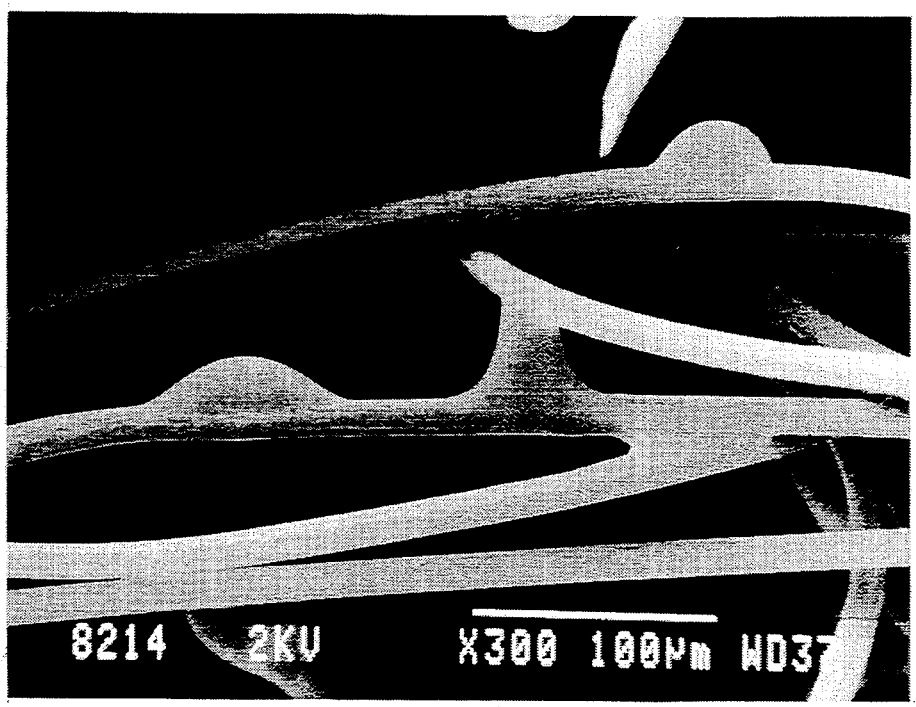
FIG. 1 is an electron microscopic photograph showing a cross-section of an embodiment of the heat resistant nonwoven fabric of the present invention having pillar-shaped thermoplastic resin melt-bonding members.

The heat-resistant nonwoven fabric of the present invention comprises 50 to 95% by weight of heat resistant fibers and 5 to 50% by weight of thermoplastic resin melt-bonding members through which the heat resistant fibers are bonded to each other.

The heat resistant fibers used for the present invention form a framework of the heat resistant nonwoven fabric and may be continuous filaments or staple fibers. Concretely, the heat resistant fibers can be selected from the group consisting of wholly aromatic polyamide fibers, wholly aromatic polyester fibers, novoloide fibers, oxidization-treated fibers, for example, oxidized acrylic fibers, glass fibers, ceramic fibers and metallic fibers. Among the above mentioned fibers, the wholly aromatic polyamide fibers have an excellent heat resistance and a high producibility, and thus are preferably utilized for the present invention.

The aromatic polyamide fibers include poly-m-phenyleneisophthalamide fibers and modified fibers thereof, and poly-p-phenyleneterephthalamide fibers and modified fibers thereof. Among those fibers, the poly-m-phenyleneisophthalamide fibers are preferable for the present invention, as such fibers are easily formed into a web, and do not melt at a temperature of 350° C. or more, and thus can form a firm framework of the nonwoven fabric.

The thermoplastic resins or thermoplastic resin fibers usable for the present invention have a melting point of from about 210° C. to 360° C. The thermoplastic resin fibers may be continuous filaments or staple fibers and can be selected from polyphenylenesulfide fibers, polyetheretherketone fibers, polyester fibers, for example, polyethyleneterephthalate and polybutyleneterephthalate fibers, and polyamide fibers, for example, nylon 6 and nylon 66 fibers. Among these fibers, the polyphenylenesulfide fibers have an excellent heat resistance, chemical resistance and flame retardancy, and thus are most preferable for the present invention.

As the polyphenylenesulfide fibers, those having a melt flow ratio (MFR) of 280 g/10 min or less determined by the method of ASTM-1238 (E) are preferably used. If the MFR is more than 280 g/10 min, when the resultant polymer is melt-spun, the spun filaments are often broken, and thus the formation of filaments becomes difficult.

Also, to enhance the mechanical strength of the nonwoven fabric and to improve the form-stability thereof, by providing a sufficiently large amount of pillar-shaped melt-bonding members between the heat resistant fibers during a heat treatment with a high temperature hot air streams, the polyphenylenesulfide resin must exhibit a low viscosity at a high temperature, and the heat resistant fibers must be made satisfactorily met therewith. To meet this requirement, the MFR of the polyphenylenesulfide resin preferably does not exceed a level of 70 g/10 min, and more preferably is from 150 to 250 g/10 min.

Although the polyphenylenesulfide fibers may be undrawn fibers or drawn fibers, preferably the fibers have a heat shrinkage at 250° C. (hereinafter referred to as $S_{250}$) of 15% or less and a breaking strength of 4.5 g/d or more. The polyphenylenesulfide fibers having the above-mentioned heat shrinkage and breaking strength effectively ensure that the resultant nonwoven fabric has a continuous density gradient in the direction of the thickness thereof.

When the $S_{250}$ is more than 15%, the melt-bonding members suffer a very rapid thermally shrinkage before the bonds between the heat resistant fibers are produced, and therefore, it is difficult to provide the continuous density gradient of the nonwoven fabric in the direction of the thickness thereof. Also, the number of resultant bonds between the heat resistant fibers is not sufficiently large, and thus the resultant nonwoven fabric exhibits an unsatisfactory mechanical strength.

When the breaking strength of the polyphenylenesulfide fibers is less than 4.5 g/d, the resultant bonding strength between the heat resistant fibers is low, and when the polyphenylenesulfide fibers are subjected to a carding procedure, the fibers exhibit a poor capability to be carded, and thus the producibility of the nonwoven fabric becomes low.

During the high temperature hot air treatment, almost all of the polyphenylenesulfide fibers in the nonwoven fabric are melted to an extent such that the fiber form thereof is substantially lost, and at least portions of the melted polyphenylenesulfide fibers form the pillar-shaped melt-bonding members through which the heat resistant fibers are bonded to one another.

In the nonwoven fabric of the present invention, the content of the heat resistant fibers is 95 to 50%, preferably 90 to 60% by weight.

When the content exceeds 95%, the bonds of the heat resistant fibers to each other through the thermoplastic resin melt-bonding members become weak, and the resultant nonwoven fabric exhibits a low physical strength, and thus is sometimes broken during a shaping procedure. Also, the resultant nonwoven fabric cannot be easily provided with a density gradient in the direction of the thickness thereof, and thus exhibits a unsatisfactory filtering performance.

Also, when the content of the heat resistant fibers is less than 50%, the number of the heat resistant fibers from which the framework of the nonwoven fabric is formed becomes too small, and the number of the resultant thermoplastic resin melt-bonding members becomes too large, and therefore, the resultant nonwoven fabric exhibits an excessively high light-transmission, a rough and stiff touch and a low ultimate elongation of 30% or less, and thus becomes difficult to be shaped and cannot easily provide a density gradient in the direction of the thickness of the non-woven fabric. When this type of nonwoven fabric is used as a filter, the opening in the filter is too large, and thus the filtering efficiency is low.

In the heat resistant nonwoven fabric of the present invention, the thermoplastic resin melt-bonding members are located in the form of pillars in at least portions of the spaces between the heat resistant fibers, and bond therethrough the heat resistant fibers to one another.

Figure 2:
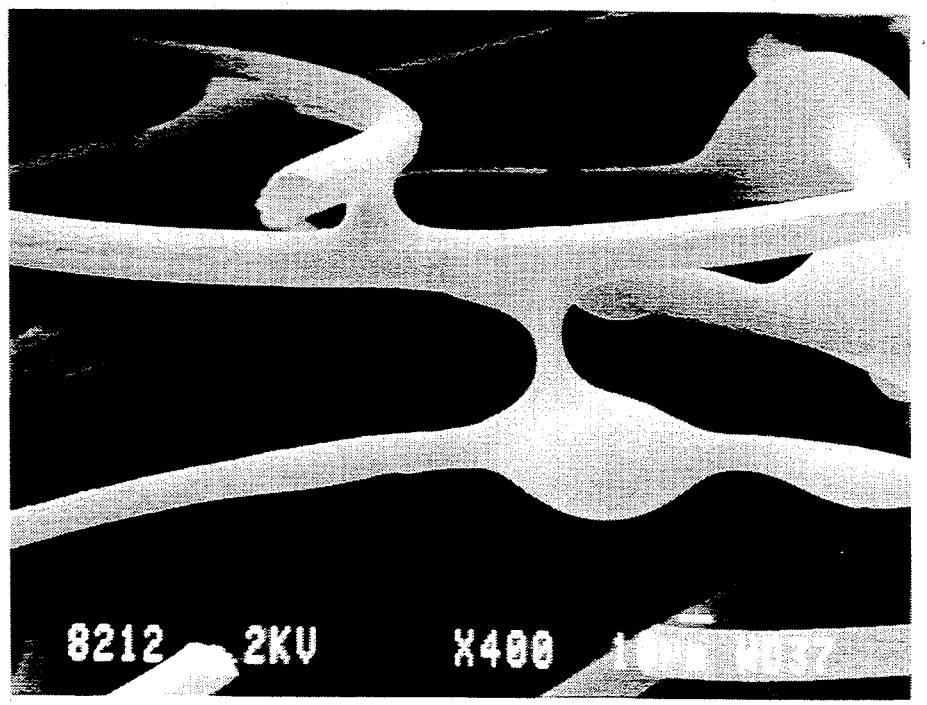
FIG. 2 is an electron microscopic photograph showing a cross-section of another embodiment of the heat resistant nonwoven fabric of the present invention having pillar-shaped thermoplastic resin melt-bonding members; and, FIG. 3 is a graph showing density gradients of the heat resistant nonwoven fabrics of the present invention (Examples 1 and 4) and other nonwoven fabrics (Comparative Examples 4 and 8).

The pillar-shaped melt-bonding members are derived from melt masses of the thermoplastic resin and bond the heat resistant fibers, which intersect each other on multiple levels, to each other therethrough. The melt-bonding members are in the form of pillars extending between and bridging the heat resistant fibers to each other, as indicated in FIGS. 1 and 2, in which electron microscopic views of cross-sections of the heat resistant nonwoven fabrics of the present invention are shown. The pillars of the melt-bonding members usually have a length of from 10 μm to several tens μm.

As mentioned above, in the conventional heat resistant nonwoven fabric produced by a heat press-melt bonding method, the heat resistant fibers were closely adhered to each other, and the resultant nonwoven fabric naturally had a high fiber density. Therefore, it was difficult to obtain a heat resistant nonwoven fabric having a low density by the heat press-bonding method.

Conversely, the present invention successfully produces a heat resistant nonwoven fabric having a low density, which could not be obtained by the conventional heat-resistant nonwoven fabric, by bonding the heat resistant fibers through the melt-bonding members extending in the form of pillars between the heat resistant fibers.

Namely, the heat resistant fabric of the present invention has a density of 0.005 to 0.10 g/cm$^3$. The density of the heat resistant fabric can be controlled by controlling a degree of crimp, a thickness of individual fibers, preliminary heating conditions before a heat treatment and a degree of needle punching.

Where the density is less than 0.005 g/cm$^3$, the number of bonding points of the fibers in the resultant nonwoven fabric to each other becomes small, and thus the resultant nonwoven fabric exhibits an unsatisfactory mechanical strength and an undesirably high bulkiness, and therefore the handling property thereof are lowered. Also, when the low density nonwoven fabric is shaped, the resultant shaped article has undesirably thin portions thereof, and thus the quality of the shaped product becomes uneven. Also, the provision of a desirable continuous density gradient in the nonwoven fabric is difficult, and when the nonwoven fabric is used as an air filter, the resultant air filter exhibits a very poor dust-collecting efficiency.

When the above-mentioned density exceeds 0.10 g/cm$^2$, the resultant nonwoven fabric has a high stiffness, and after shaping, exhibits a rough and rigid hand. Also, the number of bonding points of the fibers is too large, and thus the resultant nonwoven fabric exhibits a poor freedom of deformation thereof. Further, in the above-mentioned high density, it is difficult to provide a preferable continuous density gradient of the nonwoven fabric.

When the high density nonwoven fabric as mentioned above is employed as an air filter, it exhibits too high an air resistance, and thus the pressure loss during dust-collection is significantly increased.

Generally, when the nonwoven fabric is employed as an air filter, the density of the fabric is preferably from 0.005 to 0.05 g/cm$^3$.

When the nonwoven fabric of the present invention is used as a heat resistant covering nonwoven fabric, the density of the fabric is preferably 0.010 to 0.10 g/cm$^3$, more preferably 0.010 to 0.06 g/cm$^3$.

In this connection, the heat resistant fibers in the nonwoven fabric preferably contains a pigment, and the nonwoven fabric preferably has an ultimate elongation of from 30 to 80%, more preferably 35 to 70%.

The pigment-containing heat resistant fibers are used to enhance the concealing effect of the resultant nonwoven fabric.

When the ultimate elongation is less than 30%, in a shaping procedure, a deformation of the resultant nonwoven fabric is difficult, undesirable wrinkles are created on the fabric, and sometimes the fabric is broken.

When the ultimate elongation is more than 80%, in the shaping procedure, the nonwoven fabric is locally excessively elongated to form thin portions, and the resultant product has an uneven thickness.

The nonwoven fabric of the present invention preferably has a density gradient satisfying the relationship (1) as shown below.

$$0.0125\, n^2 - 0.2000\, n + 1.1875 \geq W_n/W_1 \geq 0.0738\, n^2 - 0.6800\, n + 1.6062 \quad (1)$$

wherein, when the nonwoven fabric is cut into five equal slices in parallel to the surface of the fabric, $W_1$ represents a weight of a lowest slice, n is a number of a slice counted from the lowest slice, when the nonwoven fabric is cut into five equal slices in parallel to the fabric surface, and $W_n$ represents a weight of a slice in a number of n counted from the lowest slice when the nonwoven fabric is cut into five equal slices in parallel to the fabric surface.

When the nonwoven fabric does not have a continuous density gradient in the direction of the thickness thereof, satisfying the above-mentioned relationship (1), if the nonwoven fabric is employed as an air filter the resultant heat resistant nonwoven fabric air filter does not uniformly collect dust at each portion of the fabric, and thus the dust is concentrically collected at local portions of the fabric, and this local collection of the dusts causes a significantly increased pressure loss of the fabric.

Figure 3:
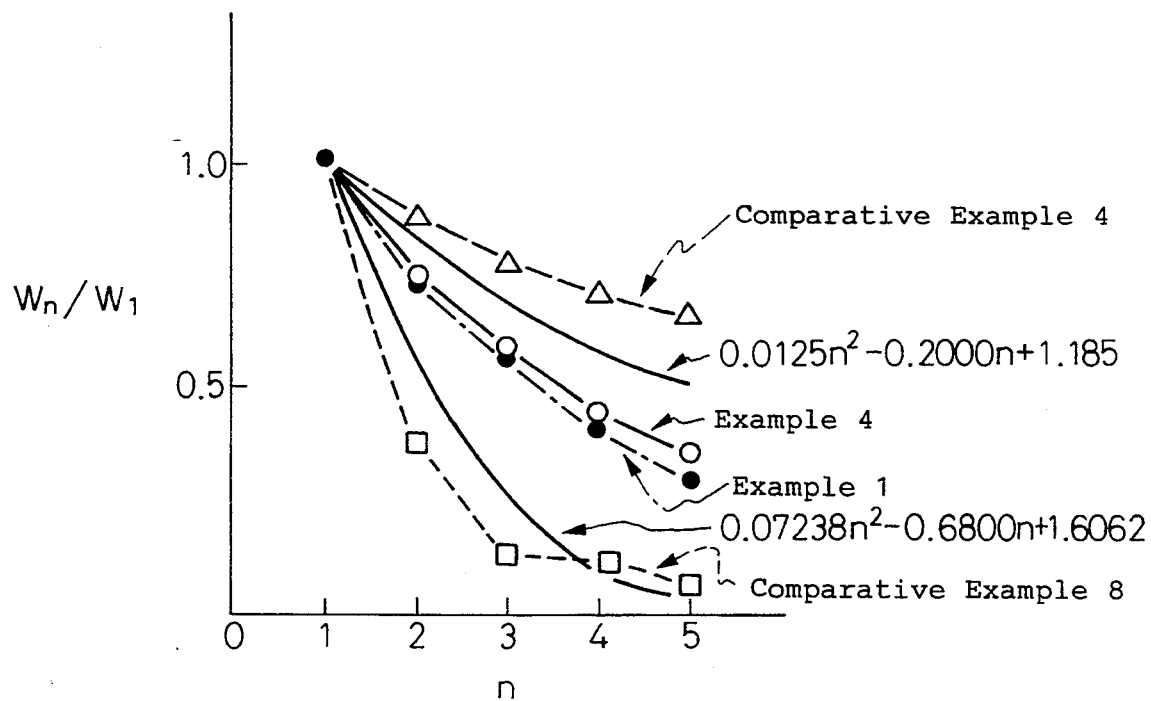

FIG. 3 shows a upper limit curve and a lower limit curve of the $W_n/W_1$ values; a nonwoven fabric having $W_n/W_1$ values located between the two curves exhibits an excellent filtering performance.

Where the heat resistant nonwoven fabric is used as a heat resistant shape-covering nonwoven fabric, the heat resistant fibers are preferably given a dark color by using a heat resistant pigment, for example, carbon particles. The heat resistant pigment is preferably used in a content of 0.1 to 5%, more preferably 0.3 to 3%, based on the weight of the fibers.

When the content of the heat resistant pigment is less than 0.1%, the resultant nonwoven fabric exhibits a high light transmission, and thus the concealing effect of the fabric sometimes becomes unsatisfactory.

A content of the heat resistant pigment of more than 5% causes a decrease in the mechanical strength of the resultant heat resistant fibers, and therefore, the resultant nonwoven fabric sometimes exhibits an undesirably lowered mechanical strength and is not usable in practical use.

The thermoplastic resin fibers usable for producing the heat resistant shape-covering nonwoven fabric preferably have a melting point of 250° C. to 360° C., more preferably 260° to 340° C.

When the melting point of the thermoplastic resin fibers is less than 250° C. the resultant nonwoven fabric is sometimes thermally deformed during a practical use thereof.

Also, when the melting point is more than 360° C., not only does the shaping process of the resultant nonwoven fabric become difficult but also the shaping process must be carried out at a high temperature, and thus the physical properties of the heat resistant fibers, from which the framework of the nonwoven fabric is formed, is lowered.

Preferably, the thermoplastic resin fibers usable in the nonwoven fabric of the present invention have a thickness of the individual fibers of 0.5 to 1.5 denier.

When the individual fiber denier of the thermoplastic resin fibers is less than 0.5, in a carding procedure, etc., for the production of the nonwoven fabric, the producibility of a web is low and the uniformity in quality of the resultant product is lowered. Also, the resultant thermoplastic resin melt-bonding members formed between the heat resistant fibers are too small, and thus an efficiency by which the heat resistant fibers are bonded to each other through the pillar-shaped melt-bonding members is sometimes lowered. When the pillar-shaped melt-bonding members are too small, the resultant nonwoven fabric sometimes exhibits a dull hue.

When the thermoplastic resin fibers have an individual fiber denier of more than 15, the mutual bonding of the heat resistant fibers becomes nonuniform, and thus the resultant nonwoven fabric exhibits a rough and stiff touch, and since the resultant pillar-shaped melt-bonding members become too large and unevenly distributed, the resultant nonwoven fabric sometimes exhibits a nonuniform hue.

The melting of the thermoplastic resin fibers is carried out to thermally bond the heat resistant fibers to each other through the resultant pillar-shaped melt-bonding members, and to enhance a concealing effect of the nonwoven fabric by irregularly reflecting light on the melt-bonding members, and to improve the brightness of the hue of the nonwoven fabric by covering the surfaces of colored fibers with the melted polymer.

In the production of the heat resistant shape-covering nonwoven fabric, the preferable thermoplastic fibers are polyphenylenesulfide fibers.

The nonwoven fabric of the present invention is produced by mixing heat resistant fibers with thermoplastic resin fibers, forming a web from the resultant fiber mixture, and applying a hot air heat treatment at a high temperature to the resultant web, to thereby melt only the thermoplastic resin fibers and bond the heat resistant fibers to each other through the resultant melt-bonding members.

In the formation of the web, a customary carding method or an air lay method can be used. To enhance the handling property of the web, a light pressing or needle-punching operation can be additionally applied to the web.

The high temperature hot air heat treatment can be carried out by utilizing a net-conveyer type dryer or oven.

The high temperature hot air heat treatment can be carried out at a temperature higher than the melting point of the thermoplastic resin fibers to a certain extent, at which temperature, the thermoplastic resin fibers can be melted while thermally shrinking at an appropriate shrinkage. Concretely, the hot air heat treatment is preferably carried out at a temperature of 20° C. to 60° C. above the melting point of the thermoplastic resin fibers. More preferably, the heat treatment temperature is 30° C. to 50° C. above the melting point of the thermoplastic resin fibers.

In the range of from 20° C. to 60° C. above the melting point of the thermoplastic resin fibers, almost all of the thermoplastic resin fibers are melted in the form of masses or lumps to an extent such that substantially nothing of the fiber form of the thermoplastic resin is left, and the resultant melt-bonding members bond the heat resistant fibers to each other therethrough. The melt of the thermoplastic resin substantially does not flow downward and either portions of the heat resistant fibers located close to each other or portions of the heat resistant fibers spaced from each other are bonded through the pillar-shaped melt-bonding members, whereby the heat resistant fibers are bonded to each other in an ideal bonding manner.

When the temperature of the high temperature hot air heat-treatment is lower than the above-mentioned lower limit, the thermoplastic resin fibers are left in the form of fibers, and thus a satisfactory bonding of the heat resistant fibers to each other sometimes cannot be obtained.

When the temperature of the high temperature hot air heat treatment is higher than the upper limit as mentioned above, the thermoplastic resin fibers are melted and the melt flows down, and accordingly, the melt bonding points are concentrically formed locally in lower layer portions of the resultant nonwoven fabric. Therefore the resultant nonwoven fabric has the bonding points located in upper layer portions thereof in an unsatisfactorily small number. The distribution of the bonding points therefore becomes uneven, and thus the resultant nonwoven fabric cannot be practically used.

In the method of the present invention, the high temperature hot air heat treatment is preferably carried out at a blowing velocity of the hot air of 0.2 to 2.0 m/sec, more preferably 0.3 to 1.0 m/sec.

In the high temperature hot air heat treatment in the method of the present invention, the heat resistant fibers are thermally softened, the thermoplastic resin fibers are melted while shrinking, and in the above-mentioned procedures, the density gradient is created and the bonding points are formed. When the hot air-blowing velocity is too high, sometimes the density of the resultant nonwoven fabric becomes high or the continuity of the density gradient of the resultant nonwoven fabric is lowered.

When the hot air blowing velocity is too low, the heat treatment must be carried out for a long time and the bonding of the heat resistant fibers is effected only in an upper layer portion of the resultant nonwoven fabric, and therefore, the formation of the pillar-shaped melt-bonding members between the heat resistant fibers becomes difficult.

The thickness of the heat resistant fibers usable for the present invention is preferably larger than that of the thermoplastic-resin fibers.

When the thickness of the heat resistant fibers is smaller than that of the thermoplastic resin fibers, a good balance of the thermal shrinkage and melting of the thermoplastic resin fibers with the softening of the heat resistant fibers is lost, and thus the creation of a continuous density gradient of the nonwoven fabric in the direction of the thickness thereof becomes difficult.

The nonwoven fabric of the present invention is usable together with another nonwoven fabric to form a laminate. Also, the two or more nonwoven fabrics of the present invention can be used to form a laminate.

When the nonwoven fabric is used as a shape-covering nonwoven fabric, the fabric may be coated or impregnated with a resin, for example, resorcinol-formaldehyde resin, containing carbon, etc., to enhance the shapability, concealing property and color-deepening effect thereof.

EXAMPLE

The heat resistant nonwoven fabric of the present invention, and a process for producing same, will be further explained by way of the following specific examples.

In the examples, the following properties of the nonwoven fabric were determined and evaluated by the test methods described below.

1. Density of Nonwoven Fabric

A specimen of a nonwoven fabric was cut into dimensions of 10 cm × 10 cm and a weight W of the cut specimen was measured.

The thickness H of the specimen was measured while placing a weight plate of 0.3 g/cm² on the specimen.

The density of the nonwoven fabric was calculated from the following equation.

Nonwoven fabric density $(g/cm^3) = W/10 \times 10 \times H$

2. Density Gradient

A thickness of a specimen of a nonwoven fabric was measured under a load of 0.5 g/cm². The nonwoven fabric specimen was impregnated with paraffin to eliminate variations in the thickness of the specimen. The paraffin-impregnated specimen was cut into 20 pieces each having dimensions of 1 cm × 1 cm. Each nonwoven fabric piece was cut into 5 equal slices in parallel to the surface of the nonwoven fabric piece.

Each slice was immersed in n-hexane to dissolve and remove the paraffin, and the weight of the remaining nonwoven fabric piece was measured.

3. Shapability

A mold was composed of a mold half having a circular cone-shaped projection having a diameter of 3 cm and a height of 3 cm, and another mold half having a concavity capable of receiving the circular cone-shaped projection therein, with a gap therebetween. A specimen of a nonwoven fabric was interposed between the mold halves and heat-pressed to provide a shaped nonwoven fabric. The shapability of the nonwoven fabric was evaluated by observing the result of the heat-pressing procedure by the naked eye.

4. Filtering Performance

In accordance with JIS Z-8901, the filtering performance of a nonwoven fabric specimen was determined by filtering air containing 15 types of dust in a dust concentration of 100 mg/m³ at an air stream velocity of 1 m/sec through the specimen, and further filtering the filtered air through a high density felt exhibiting a dust collecting efficiency of 99.5% or more when air containing 15 types of dust was filtered at an air stream velocity of 1 m/sec, to collect the dust not collected by the preceding filtration.

Provided that the nonwoven fabric specimen exhibits a static pressure difference ΔP in mmH₂O (initial pressure loss) before the filtration of the above-mentioned dust-containing air, the dust containing air-filtering procedure was continued until the static pressure difference reached twice the initial pressure loss ΔP. The amount of dust collected by the filtering test was represented by $W_1(g)$ and the amount of dust collected by the above-mentioned high density felt from the filtered air was represented by $W_2(g)$.

The dust-collecting efficiency of the nonwoven fabric was calculated in accordance with the following equation.

Dust-collecting efficiency $= [W_1/(W_1+W_2)] \times 100 (\%)$

The dust holding capacity (DHC) of the nonwoven fabric, which is utilized as a scale of the durability of a filter in use, was calculated from the following equation.

$DHC = W_1(g)/area(m^2)$ of filter

5. Concealing Effect

A nonwoven fabric was cut into specimens each having dimensions of 20 cm × 20 cm. The cut specimens were placed on a white paper sheet, and the concealing effect of the specimens with regard to the white paper sheet was evaluated by naked eye observation.

6. Ultimate Elongation

A nonwoven fabric was cut into specimens having a width of 5 cm.

Two end portions were clamped with a pair of clamping Jaws of a tension tester at a distance of 1 cm between the clamping Jaws, and the specimen was elongated at an elongating rate of 10 cm/min until breakage of the specimen. An elongation percentage of the specimen when a maximum was stress applied to the specimen was recorded.

The above-mentioned measurements were repeated 10 times in each of warp and weft directions of the specimen, and the ultimate elongation of the specimen in each of the warp and weft directions was represented by an average value of the results of the 10 measurements.

Example 1

A blend of 80% by weight of a heat resistant fiber component consisting of wholly aromatic polyamide fibers (Cornex, made by Teijin Ltd.) having an individual fiber thickness of 13 denier and a fiber length of 76 mm, with 20% by weight of a thermoplastic resin fiber component consisting of PPS fibers having an MFR of 100, determined by the method of ASTM 1238(E), an individual fiber thickness of 2 denier, a fiber length of 76 mm, a S250 of 12% and an breaking strength of 5.7 g/d was prepared by a fiber opener, webs were produced from the fiber blend by using a roller carding machine, and a laminated web having a weight of 110 g/m$^2$ was produced by laminating the webs by using a crosslayer.

The laminated web was subjected to a heat treatment in a conveyer type hot air dryer at a temperature of 32° C. and an air flow velocity of 1 m/sec, for a heating time of 5 minutes, to provide a nonwoven fabric having a weight of 120 g/m$^2$, a thickness of 5.5 mm, and a density of 0.022 g/cm$^3$.

In the resultant nonwoven fabric, the PPS fibers were completely melted without retaining the fiber form thereof, and were converted to melt-bonding members extending in the form of pillars, as shown in FIGS. 1 and 2, or in the form of water drops, to bond the heat resistant fibers to each other therethrough.

The resultant nonwoven fabric was cut into five equal slices in parallel to the nonwoven fabric surface, and the weight ratios of the slices to each other were determined. The results are shown in Table 3.

The filtering properties of the resultant nonwoven fabric are shown in Tables 1 and 2.

In the filtering properties of the nonwoven fabric, the pressure loss was 3.1 mm H$_2$O, the dust-collecting efficiency was 68%, and the dust-holding capacity was 280 g/m$^2$. Namely, the nonwoven fabric exhibited excellent filtering properties and a long durability in use as a filter, and thus was practical. As a result of a flame retardancy test and evaluation in accordance with UL-478 method, the nonwoven fabric passed a 94V-0 class requirement, and thus exhibited a very high level of flame retardancy.

After exposing the nonwoven fabric to a hot air blow at a temperature of 180° C. for 2 months, substantially no change was found in the fabric, and thus it was confirmed that the nonwoven fabric had a high heat resistance.

Comparative Example 1

A web having the same fiber constitution as in Example 1 was produced and lightly needle punched. The resultant web was heated by a hot air blow at 290° C. while pressing, to provide a nonwoven fabric having a weight of 119 g/m$^2$, a thickness of 5.4 mm, and a density of 0.022 g/cm$^3$.

The resultant nonwoven fabric had a substantially uniform cross-sectional profile and substantially no density gradient was found in the fabric.

In the resultant nonwoven fabric, a portion of the PPS fibers was retained in the form of fibers, and another portion of the PPS fibers bonded the heat resistant fibers to each other therethrough. The bonded fibers had a low bonding strength and were easily separated from each other.

The filtering properties of the nonwoven fabric were measured. The pressure loss of the nonwoven fabric was 3.0 mmH$_2$O, which is in the same level as in Example 1, but the dust-collecting efficiency of the fabric was 59% and the dust-holding capacity of the fabric was 180 g/m$^2$, which were lower than those in Example 1. Thus, the nonwoven fabric had a low filter-use durability.

Example 2

A nonwoven fabric was produced by the same procedures as in Example 1, except that the heat resistant fiber component consisted of poly-p-phenyleneterephthalamide fibers in an amount of 60% by weight and the thermoplastic resin fiber component consisted of PPS fibers in an amount of 40% by weight.

The resultant nonwoven fabric had a weight of 100 g/m$^2$, a thickness of 5.2 mm, and a density of 0.019 g/cm$^3$.

Also, the nonwoven fabric had a density gradient in the direction of the thickness thereof satisfying the relationship (1). The filtering performances of the nonwoven fabric were measured, and it was found that the pressure loss was 4.0 mm H$_2$O, the dust-collecting efficiency was 66%, and the dust-holding capacity was 270 g/m$^2$ and thus the filtering performances of the nonwoven fabric were satisfactory.

In the nonwoven fabric, more pillar-shaped melt-bonding members consisting of the PPS resin were formed than in Example 1.

Comparative Example 2

A web having a basis weight of 90 g/m$^2$ was produced from heat resistant fibers consisting of 100% of wholly aromatic polyamide fibers (Cornex, Teijin Ltd.) having an individual fiber denier of 13 and a fiber length of 76 mm.

After drying, the two surfaces of the web were spray-coated with an acrylic acid ester resin solution and again dried, to provide a nonwoven fabric having a basis weight of 120 g/m$^2$.

The resultant nonwoven fabric had a thickness of 12.0 mm and a density of 0.010 g/cm$^3$. The resin was distributed concentrically on the two surface portions of the nonwoven fabric and the amount of the resin located within the inside middle portion of the nonwoven fabric was small, and thus the resin-coated nonwoven fabric had an uneven resin distribution.

In the measurement of the filtering performances, the nonwoven fabric exhibited a pressure loss of 30.1 mm H$_2$O, a dust-collecting efficiency of 64%, and a dust-holding capacity of 100 g/m$^2$, and thus the filtering performances of the nonwoven fabric were very poor.

In the observation of the bonding state of the heat resistant fibers in the nonwoven fabric, it was confirmed that only in portions of the fabric in which the heat resistant fibers were located closely to each other and intersected each other were the heat resistant fibers satisfactorily bonded to each other, and in other portions of the nonwoven fabric in which the heat resistant fibers were spaced from each other and intersected each other, the acrylic acid ester resin was adhered in the form of spindles to the heat resistant fibers and no pillar-shaped melt-bonding member was found.

Example 3

The same procedures as in Example 1 were carried out except that the individual fiber thickness of the heat resistance fibers was changed to 3 denier, the individual fiber thickness of the PPS fibers was changed to 1.5 denier, and the high temperature hot air heat treatment for the needle punched web was carried out by using hot air at a temperature of 320° C. and an air flow velocity of 2 m/sec.

In the resultant nonwoven fabric, it was confirmed that the PPS fibers were completely melted to an extent such that no fiber forms were retained, as mentioned in Example 1, and pillar-shaped melt-bonding members as shown in FIGS. 1 and 2 were formed to bond the heat resistant fibers to each other therethrough.

The density gradient of the nonwoven fabric in the direction of the thickness thereof satisfied the relationship (I), and the nonwoven fabric exhibited a high dust-collecting efficiency of 65% and a high dust-holding capacity of 270 g/m².

Comparative Examples 3 and 4

In Comparative Example 3, the same procedures as in Example 1 were carried out except that the mixed content of the PPS fibers was changed to 55%, and the mixed content of the wholly aromatic polyamide fibers (Cornex, Teijin Ltd.) was changed to 45%.

In the resultant nonwoven fabric, the density gradient in the direction of the thickness thereof was small, the dust-collecting efficiency was low, and the dust-holding capacity was poor, because the pores formed therein were too large.

The density gradient of the nonwoven fabric of Comparative Example 3 is shown in FIG. 3.

Also, in Comparative Example 4, the same procedures as in Example 1 were carried out except that the mixed content of the PPS fibers was changed to 2%, and the mixed content of the wholly aromatic polyamide fibers (Cornex, Teijin Ltd.) was changed to 98%.

In the resultant nonwoven fabric, the melt-bonding of the heat resistant fibers through the PPS fibers was unsatisfactory, the density gradient of the nonwoven fabric was close to zero, and the form-retaining property of the nonwoven fabric as a filter was low. Therefore, the nonwoven fabric was unsatifactory for practical use.

The performances of the nonwoven fabric of Example 1 and 2 and Comparative Examples 1 to 4 are shown in Tables 1 and 2.

TABLE 1

| | | Heat resistant fiber | | PPS fiber | | | |
|---|---|---|---|---|---|---|---|
| Example No. | Polymer | Individual fiber thinkness (denier) | Content (%) | MFR of PPS (g/min) | Individual fiber thickness (denier) | Content (%) | Temperature of heat treatment (°C.) |
| Example 1 | PM1D(*)₁ | 13 | 80 | 100 | 2 | 20 | 310 |
| Comparative Example 1 | PM1D | 13 | 80 | 100 | 2 | 20 | 290 |
| Example 2 | PPTD(*)₂ | 6 | 60 | 100 | 2 | 40 | 310 |
| Comparative Example | | | | | | | |
| 2 | PM1D | 13 | 100 | (*)₃ | — | — | 120 |
| 3 | PM1D | 6 | 45 | 100 | 2 | 55 | 310 |
| 4 | PM1D | 6 | 98 | 100 | 2 | 2 | 310 |

Note:
(*)₁PM1D ... Poly-m-phenylene isophthalamide
(*)₂PPTD ... Poly-p-phenylene terephthalamide
(*)₃A binder liquid containing an acrylic acid ester resin was applied by spraying.

TABLE 2

| | Properties of nonwoven fabric | | | | Filtering performances of nonwoven fabric | | | |
|---|---|---|---|---|---|---|---|---|
| Example No. | Basis weight (g/m²) | Thickness (mm) | Density (g/cm³) | Density gradient in direction of thickness of nonwoven fabric | Pressure low (mmH₂O) | Dust-collecting efficiency (%) | Dust-holding capacity (g/m²) | Remarks |
| Example 1 | 120 | 5.5 | | Satisfying retationship (1) | 3.1 | 68 | 280 | — |
| Clomparative Example 1 | 119 | 5.4 | | Nothing | 3.0 | 59 | 180 | — |
| Example 2 | 100 | 5.2 | | Satisfying retationship (1) | 4.0 | 66 | 270 | — |
| Comparative Example | | | | | | | | |
| 2 | 120 | 12.0 | | Nothing | 30.1 | 64 | 100 | — |
| 3 | 102 | 5.3 | | Not satisfying retationship (1) | 2.5 | 40 | 110 | — |

TABLE 2-continued

| | Properties of nonwoven fabric | | | Density gradient in direction of thickness of nonwoven fabric | Filtering performances of nonwoven fabric | | | |
|---|---|---|---|---|---|---|---|---|
| Example No. | Basis weight (g/m²) | Thickness (mm) | Density (g/cm³) | | Pressure low (mmH₂O) | Dust-collecting efficiency (%) | Dust-holding capacity (g/m²) | Remarks |
| 4 | 105 | 5.4 | | Nothing | 3.7 | 45 | 150 | (*)4 |

Note:
(*)4 ... The nonwoven fabric had a low machanical strength, and thus could not be practivally used.

Example 4

A blend of 80% by weight of a heat resistant fiber component consisting of wholly aromatic polyamide fibers (Cornex, Teijin Ltd.) having an individual fiber thickness of 13 denier and a fiber length of 76 mm with 20% by weight of polyethylene terephthalate fibers (having a melting point of 255° C., an individual fiber thickness of 6 denier and a fiber length of 64 mm) was prepared by a fiber opener, and then the fiber blend was converted to webs by using a roller carding machine. The webs were laminated one on the other by using a crosslayer, to provide a laminated web having a basis weight of 110 g/m².

The web was heat treated in a conveyer type hot air dryer at a temperature of 285° C. at an air flow velocity of 0.5 m/sec in the direction of the thickness of the web, for a heating time of 3 minutes to provide a nonwoven fabric having a basis weight of 118 g/m², a thickness of 14.5 mm, and a density of 0.008 g/cm³.

The resultant nonwoven fabric had the same bonding state as that of Example 1, and a number of pillar-shaped melt-bonding members formed from a melt of the polyethylene terephthalate resin existed in the nonwoven fabric.

Also, the nonwoven fabric was cut into five equal slices in parallel to the surface thereof, and the weight ratios of the slices to each other were determined. The results are shown in FIG. 3.

As a result of a measurement of the filtering performances of the nonwoven fabrics, the pressure loss was 2.5 mm H₂O the dust-collecting efficiency was 62%, which was high, the dust-holding capacity was 300 g/m², and the filter life was long.

In view of the above-mentioned physical performances, the nonwoven fabric was satisfactorily useful as a filter.

The nonwoven fabric had a density gradient that was continuous and uniform in the direction of the thickness thereof, and satisfied the relationship (1). This density gradient is shown in FIG. 3.

After exposing the nonwoven fabric to hot air at a temperature of 130° C. for one month, it was confirmed that the physical properties of the nonwoven fabric were substantially not changed, and thus the nonwoven fabric had a very high heat resistance.

Example 5

The same procedures as in Example 4 were carried out except that, as the wholly aromatic polyamide fibers, poly-p-phenylene terephthalamide fibers having an individual fiber thickness of 8 denier and a fiber length of 76 mm were employed.

The resultant nonwoven fabric had a basis weight of 115 g/m², a thickness of 15.0 mm, and a density of 0.0077 g/cm³.

The density of the nonwoven fabric in the direction of the thickness thereof had a continuous and uniform gradient similar to that of Example 4, and this density gradient satisfied the relationship (1).

The filtering performances of the nonwoven fabric were measured, and it was found that the nonwoven fabric exhibited a pressure loss of 2.4 mm H₂O a high dust-collecting efficiency of 65%, and a high dust-holding capacity of 320 g/m².

Also, it was confirmed that a number of pillar-shaped melt-bonding members consisting of the PPS resin were formed between the heat resistant fibers, and that the heat resistant fibers were bonded to each other therethrough.

Example 6

The same procedures as in Example 4 were carried out, except that the polyethylene terephthalate fibers were replaced by polybutylene terephthalate fibers (having a melting point of 225° C., an individual fiber thickness of 8 denier and a fiber length of 76 mm), and the heat treatment temperature was changed to 260° C.

The resultant nonwoven fabric had a basis weight of 110 g/m², a thickness of 15.3 mm, and a density of 0.0070 g/cm³.

The density of the nonwoven fabric had a continuous and uniform gradient similar to that of Example 4, and the density gradient satisfied the relationship (1).

As a result of the filtering performance measurements, the nonwoven fabric exhibited a pressure loss of 2.3 mm H₂O a dust-collecting efficiency of 64%, and a dust-holding capacity of 305 g/m², and thus the filtering performances thereof were excellent.

In the nonwoven fabric, a number of pillar-shaped melt bonding members consisting of the PPS resin were formed between the heat resistant fibers, to bond the heat resistant fibers to each other therethrough.

Comparative Examples 5 to 9

In Comparative Examples 5 and 6, the same procedures as in Example 4 were carried out except that the content of the polyethylene terephthalate (PET) fibers was changed to 3% and 55%, respectively.

In Comparative Example 5, since the content of the PET fibers was changed to 3%, the resultant nonwoven fabric exhibited a low mechanical strength and a small density gradient in the direction of the thickness thereof. The density gradient exceeded the upper limit of the relationship (1).

In Comparative Example 6, since the content of the PET fibers was 55%, the resultant nonwoven fabric had a larger density than that of the nonwoven fabric of Example 4 having the same basis weight as this nonwoven fabric, and a small density gradient. This density gradient exceeded the upper limit of the relationship (1).

Also, the nonwoven fabric exhibited a low dust-collecting efficiency and dust-holding capacity.

In Comparative Examples 7 and 8, the same procedures as in Example 4 were carried out except that the heat treatment temperature was changed to 265° C. and 325° C., respectively.

In Comparative Example 7, since the heat treatment temperature was 265° C. the resultant nonwoven fabric had a low tensile strength, and thus was unsatisfactory for practical use.

Also, in Comparative Example 8, since the heat treatment temperature was 325° C. in the resultant nonwoven fabric, the pillar-shaped melt bonding members derived from the thermoplastic resin fibers were locally located in a lower surface portion of the nonwoven fabric, and thus the fibers located in an upper surface portion of the nonwoven fabric were easily removable. Therefore, the nonwoven fabric was unsatisfactory for practical use.

In Comparative Example 9, the same procedures as in Example 4 were carried out except that the air flow velocity was changed to 2.5 m/sec.

The resultant nonwoven fabric had a thickness of 2.3 mm and a density of 0.06 g/cm$^3$. The density gradient of the nonwoven fabric was small and did not satisfy the relationship (1).

As a result of the filtering performance measurements, it was found that the nonwoven fabric exhibited a pressure loss of 10 mm H$_2$O, a dust-collecting efficiency of 45% and a dust-holding capacity of 70 g/m$^2$.

The filtering performances of the nonwoven fabric were unsatisfactory.

The density gradient in Comparative Example 5 is indicated in FIG. 3.

Example 7

A fiber blend was prepared by mixing 80% of poly-m-phenyleneisophthalamide staple fibers (Cornex, made by Teijin Ltd.) containing 5% by weight of a pigment and having a denier of 3 and a fiber length of 51 mm with 20% of PPS staple fibers (having a melting point of 280° C. and made by Teijin Ltd.) having a denier of 2 and a fiber length of 51 mm. The fiber blend was converted to a web by using a roller cording machine, and a needle-punching treatment was applied to the web at a penetration number of 100/cm$^2$ and a needling depth of 10 mm.

The resultant nonwoven fabric (having a basis weight of 46.7 g/m$^2$, a thickness of 2.97 mm and a density of 0.015 g/cm$^2$) was placed on a net, and hot air was blown toward the nonwoven fabric at a temperature of 320° C. and a flow velocity of 2 m/sec, for 5 minutes, to heat treat the nonwoven fabric and melt the PPS staple fibers, to thereby bond the heat resistant fibers to each other. The obtained nonwoven fabric had a basis weight of 45 g/m$^2$, a thickness of 2.5 mm, a density of 0.018 g/cm$^3$, and an ultimate elongation of 51%.

When the nonwoven fabric was left to stand at a temperature of 240° C. for 100 hours, the nonwoven fabric exhibited substantially no deformation thereof, and thus had a high heat resistance.

A heat resistant insulating material was covered by the nonwoven fabric and then press-formed at a temperature of 190° C. The nonwoven fabric was not broken or wrinkled, and thus exhibited a good formability. After the forming procedure, the nonwoven fabric exhibited a good concealing property and color-deepening effect.

The nonwoven fabric was subjected to a flame retarding test, and the nonwoven fabric exhibited an LOI value of 30% or more, which was satisfactory.

The nonwoven fabric had a good touch and a preferable brilliant color.

Example 8

The same procedures as in Example 7 were carried out except that the PPS fibers were replaced by polyetheretherketone staple fibers having a denier of 2 and a fiber length of 51 m (and having a melting point of 334° C. and made by Teijin Ltd.), and hot air heat treatment was carried out at a temperature of 370° C. The obtained nonwoven fabric had a basis weight of 47 g/m$^2$, a thickness of 2.1 mm, a density of 0.022 g/cm$^3$, and an ultimate elongation of 45%.

This nonwoven fabric was provided with a number of pillar-shaped melt bonding members, as indicated in FIGS. 1 and 2, and were similar to Example 7.

The results of the heat resistance test applied to the nonwoven fabric were good, and the concealing property and the color-deepening effect of the nonwoven fabric after the forming procedure were good. The forming procedure applied to the nonwoven fabric was carried out by a press-forming method at a temperature of 250° C., and the nonwoven fabric exhibited a good formability.

The nonwoven fabric was subjected to a flame retarding test, and the LOI value of the nonwoven fabric was 30% or more, which was satisfactory.

Comparative Example 10

The same needle-punched nonwoven fabric as in Example 7 was pressed, before the heat treatment, by using a clearance-provided pressing machine, at a temperature of 280° C. for 5 minutes. The resultant nonwoven fabric had a basis weight of 50 g/m$^2$, a thickness of 0.4 mm, a density of 0.125 g/cm$^3$, and an ultimate elongation of 15%.

In this nonwoven fabric, the heat insulating fibers were closely adhered to each other and the spaces between the fibers were filled by the PPS resin.

The obtained nonwoven fabric exhibited a slightly unsatisfactory concealing effect, and when the press-forming test under the same conditions as in Example 7 was applied to the nonwoven fabric, a number of breakages and wrinkles occurred.

Comparative Examples 11 and 12

In Comparative Example 11, 100% of the same poly-m-phenylene isophthalate staple fibers (Cornex, Teijin Ltd.) as in Example 7 were formed into a web by using a roller carding machine, and a water-needling treatment was applied to the two surfaces of the web. The resultant nonwoven fabric had a basis weight of 52 g/m$^2$, a thickness of 0.5 mm, and a density of 0.104 g/cm$^3$.

The resultant nonwoven fabric had thin portions in the form of stripes, and thus exhibited an unsatisfactory concealing effect.

In consideration of the above-mentioned results, in Comparative Example 12, the water-needling conditions were changed to provide a nonwoven fabric having a basis weight of 55 g/cm$^2$, a thickness of 1.0 mm, and a density of 0.055 g/cm$^3$. Nevertheless, the resultant nonwoven fabric had thin portions, and thus exhibited an unsatisfactory concealing effect.

Comparative Examples 13 and 14

In Comparative Example 13, a web was prepared from 100% of the same poly-m-phenylene isophthalamide staple fibers as in Example 7, by using a roller carding machine. Then a needle-punching treatment was applied to the web, and the needle-punched web was resin-processed by immersing the web in an acrylic ester resin solution and adjusting the amount of the resin applied to the web to a level of 10%.

The resultant nonwoven fabric had an unsatisfactory ultimate elongation of 25%. When a forming test was applied to the nonwoven fabric without heating, the formed nonwoven fabric was provided with a number of thin portions.

In Comparative Example 14, the needle-punched, non-resin-processed nonwoven fabric exhibited an ultimate elongation of 85%. Nevertheless, in the forming test, thin portions were formed in the nonwoven fabric.

CAPABILITY OF EXPLOITATION IN INDUSTRY

The heat resistant nonwoven fabric of the present invention exhibits the following effects:

(1) a low density,
(2) an excellent formability,
(3) an easy production,
(4) a good heat resistance and flame retardancy,
(5) when employed as a heat resistant air filter, the dust collecting efficiency with respect to the pressure loss is excellent, the increase in the pressure loss due to the collection of the dust is small, and the filter has a high heat resistance and can be easily produced without restriction against the production, and
(6) when used as a heat resistant shape-covering nonwoven fabric, the concealing effect and color-deepening effect thereof are excellent.

Therefore, the heat resistant nonwoven fabrics of the present invention are useful as a heat resistant air filter and as covering sheets for heat resistant shaped articles.

Also, the process of the present invention can easily produce a heat resistant nonwoven fabric having the above-mentioned excellent performances.

We claim:

1. A heat-resistant nonwoven fabric comprising 50 to 95% by weight of heat-resistant fibers and 5 to 50% by weight of thermoplastic resin melt-bonding members melt-adhered to at least portions of the heat resistant fibers to thereby bond said fibers to each other, said thermoplastic resin melt-bonding members through which the heat resistant fibers are bonded to each other, being extended in the form of pillars bonding the heat resistant fibers to each other throughout the fabric, said nonwoven fabric having a density of 0.005 to 0.05 g/cm$^3$ and a density gradient satisfying the relationship, $0.025n^2 - 0.200n + 1.1875 \geq W_n/W_1 \geq 0.0738n^2 - 0.680n + 1.6062$, wherein, when the nonwoven fabric is cut into five equal slices in parallel to the surface of the fabric, $W_1$ represents a weight of a lowest slice, n is a number of a slice counted from the lowest slice, when the nonwoven fabric is cut into five equal slices in parallel to the fabric surface, and $W_n$ represents a weight of a slice in a number of n counted from the lowest slice when the nonwoven fabric is cut into five equal slices in parallel to the fabric surface.

2. The heat-resistant nonwoven fabric as claimed in claim 1, wherein the heat-resistant fibers are wholly aromatic polyamide fibers.

3. The heat-resistant nonwoven fabric as claimed in claim 2, wherein the wholly aromatic polyamide fibers are poly-m-phenylene isophthalamide fibers.

4. The heat-resistant nonwoven fabric as claimed in claim 1, wherein the thermoplastic resin is a polyphenylenesulfide resin.

5. The heat-resistant nonwoven fabric of claim 1, having an ultimate elongation of 30 to 80%.

6. A process for producing a heat resistant nonwoven fabric of claim 1 comprising:

blending 95 to 50% by weight of heat-resistant fibers with 5 to 50% by weight of thermoplastic resin fibers, and applying a heat treatment to the fiber blend by blowing hot air at a temperature higher than the melting point of the thermoplastic resin fibers through the fiber blend without pressing the fiber blend.

7. The process for producing the heat resistant nonwoven fabric of claim 6, wherein the heat treatment temperature is 30° C. to 50 ° C. above the melting point of the thermoplastic resin fibers, and the hot air is applied at a flow velocity of 0.3 to 1.0 m/sec.

8. The process for producing the heat resistant nonwoven fabric as claimed in claim 6, wherein the heat resistant fibers have a larger fiber diameter than the fiber diameter of the thermoplastic resin fibers.

* * * * *

UNITED STATES PATENT AND TRADEMARK OFFICE
CERTIFICATE OF CORRECTION

PATENT NO.   : 5,336,556
DATED        : August 9, 1994
INVENTOR(S)  : Makota Yoshida, et al It is certified that error appears in the above-identified patent and that said Letters Patent is hereby corrected as shown below:

Column 20, line 9; "$0.025n^2$" should read --$0.0125n^2$--.

Signed and Sealed this

Twentieth Day of February, 1996

Attest:

BRUCE LEHMAN

Attesting Officer

Commissioner of Patents and Trademarks